United States Patent

Bomar

Patent Number: 6,109,232
Date of Patent: Aug. 29, 2000

[54] LOCATING IMPLEMENT FOR ENGINE HEAD

[76] Inventor: Scott L. Bomar, 1095 Goodrick Dr., Tehachapi, Calif. 93561

[21] Appl. No.: 09/166,332

[22] Filed: Oct. 5, 1998

[51] Int. Cl.⁷ ............................... F02F 1/00; F16B 43/00
[52] U.S. Cl. ........................................ 123/193.3; 411/531
[58] Field of Search ........................ 123/193.3; 411/537, 411/531, 368

[56] References Cited

U.S. PATENT DOCUMENTS

| | | | |
|---|---|---|---|
| 1,223,106 | 4/1917 | Power | 411/368 |
| 3,386,771 | 6/1968 | Verdier et al. | 411/537 |
| 3,531,850 | 10/1970 | Durand | 411/531 |
| 5,069,176 | 12/1991 | Ruf et al. | 123/193.3 |

FOREIGN PATENT DOCUMENTS

| | | | |
|---|---|---|---|
| 795981 | 8/1937 | France | 123/193.3 |
| 728621 | 4/1955 | United Kingdom | 123/193.3 |

*Primary Examiner*—Andrew M. Dolinar
*Attorney, Agent, or Firm*—Henry M. Bissell

[57] ABSTRACT

A locating implement for use in aligning mechanical components during assembly such as the aligning of an engine head over an engine cylinder. The locating implement is installed after the head has been placed on the engine cylinder, but prior to the securing of the head to the cylinder. A generally disk-shaped body having a nipple of reduced diameter serves to accurately center mounting studs extending from the block within the corresponding receiving holes in the head. A shaped approach portion permits secure press-fitting of the locating implement to the head. Visual indexing and orientation functions are featured.

11 Claims, 3 Drawing Sheets

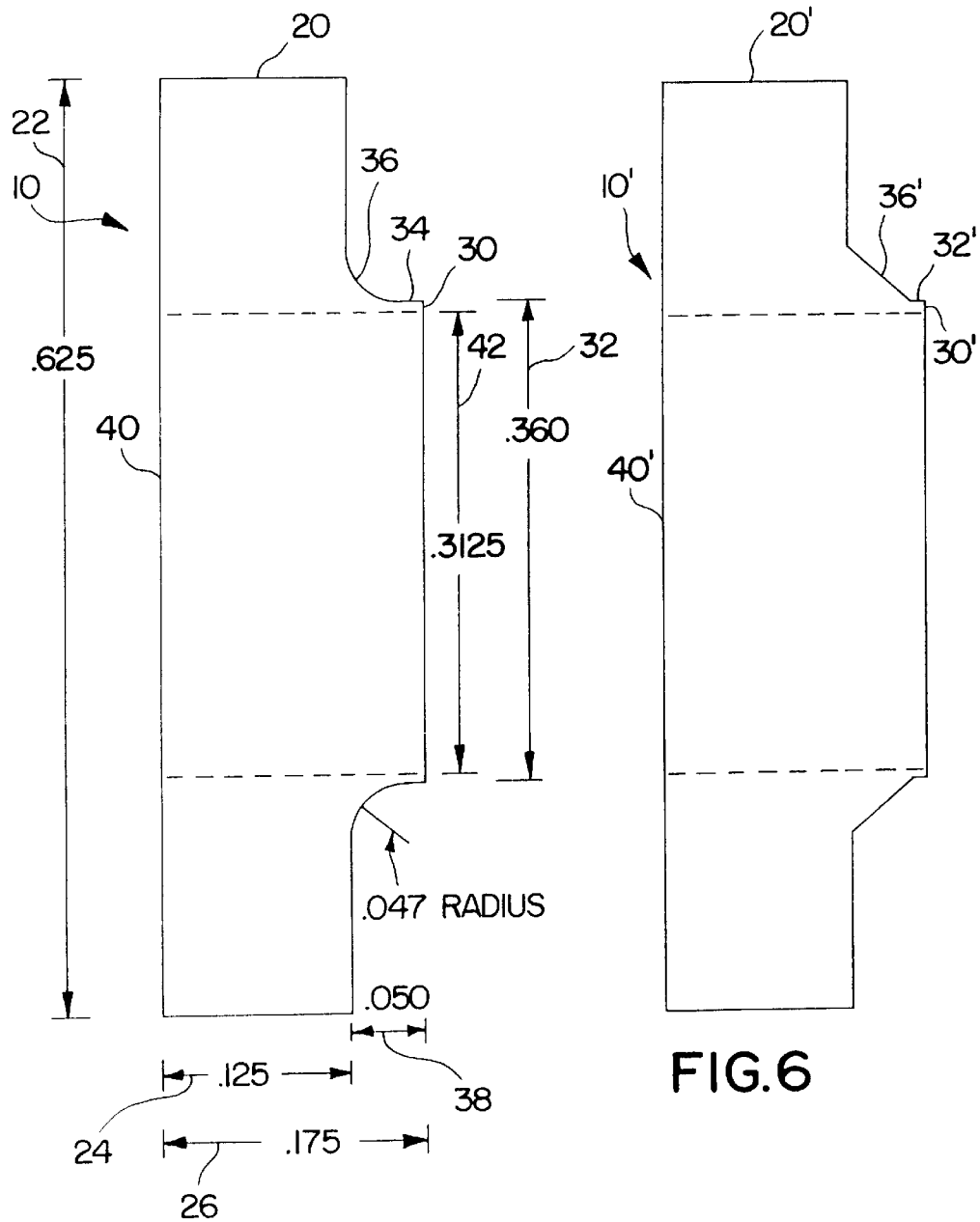

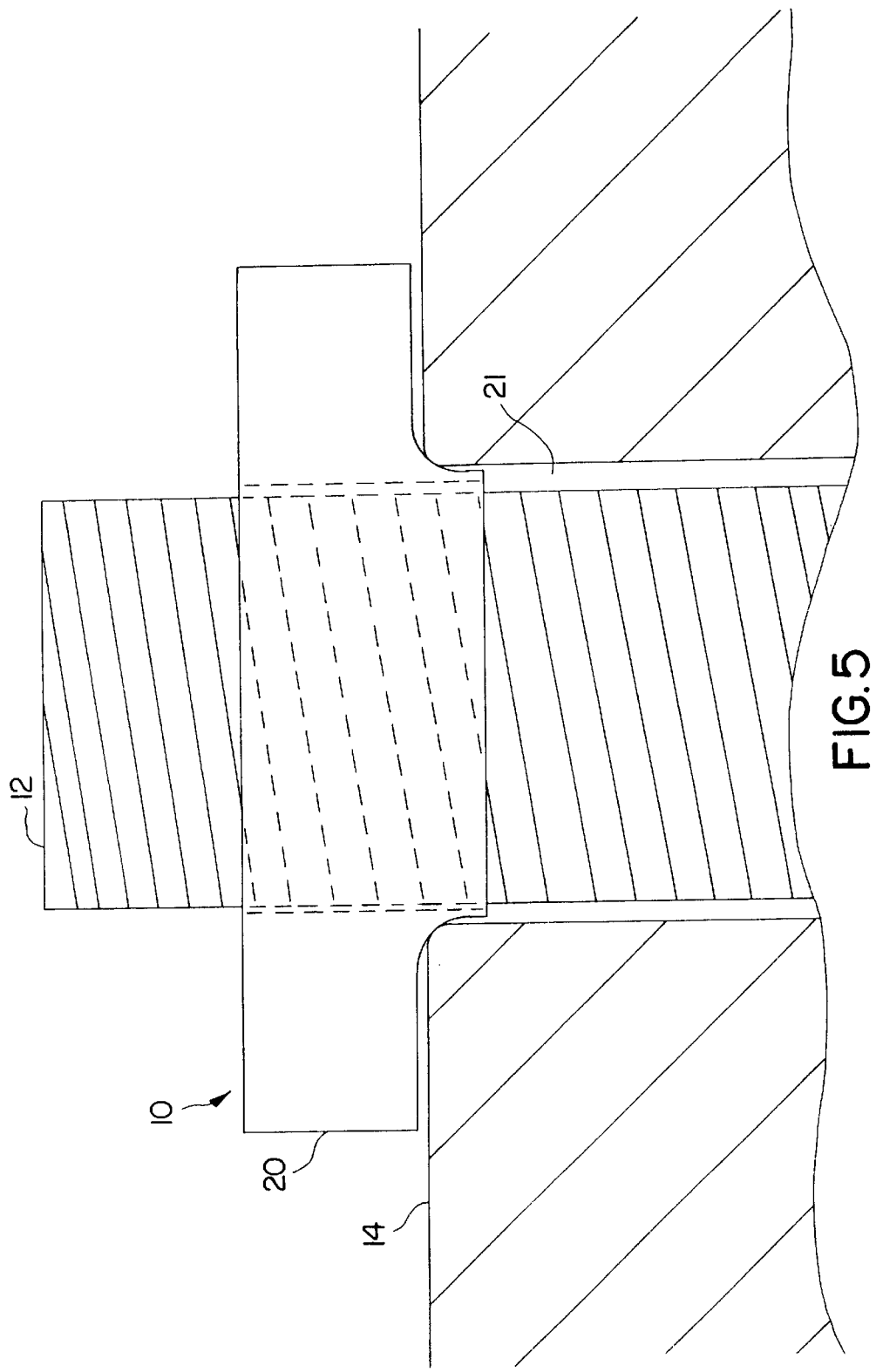

LOCATING IMPLEMENT FOR ENGINE HEAD

BACKGROUND OF THE INVENTION

1. Field of the Invention

The invention relates generally to alignment devices used in the assembly of mechanical components such as engine parts, and more particularly to locating implements used in aligning an engine head on an engine cylinder during assembly or reassembly.

2. Description of the Related Art

Small internal combustion engines are used in a wide variety of applications. One example of such engines has been manufactured by the Yamaha Corporation of Japan for 20 years or more. It is a single cylinder, air-cooled, two-cycle engine, which is widely used in go-cart racing, among other activities.

The engine is air-cooled by way of cooling fins on both the cylinder and the head. The head, mounting a spark plug, is removably attached to the block, which is in turn coupled to or integral with the case. The block contains a cylinder lined with a cylinder sleeve in which a piston is located, connected in conventional fashion to a crank shaft in the case.

The head has a recessed combustion chamber which must be centered over the cylinder in order to achieve maximum performance. This recessed portion, or dome, must be symmetrically positioned relative to the piston and cylinder or the burn pattern will be uneven and will result in lost performance.

As previously mentioned, these small internal combustion engines are often used in the highly competitive sport of go-cart racing. Racing classifications impose restrictions on several aspects of engine design, including displacement as well as other dimensions and parameters. In the course of a typical race day, the head may be removed from the cylinder four or five times in order to permit maintenance and repairs, as well as to accommodate inspections by race officials and others.

As mentioned above, accurate positioning of the recessed portion, or dome, relative to the piston in the cylinder is essential to achieve peak performance from the engine. The head is secured to the cylinder by nuts threaded onto six studs extending from the cylinder and passing through the head. The studs are evenly spaced in a symmetrical pattern, centrally aligned with the cylinder. The head is designed with stud-receiving holes adapted to receive the studs extending from the cylinder. With these engines as heretofore constructed, it is no simple task to achieve the desired alignment of the head on the cylinder. The problem stems from the excessive tolerance in the dimensions of the stud holes in the head relative to the studs which must extend therethrough to receive the nuts which, when tightened down, fix the head in place on the cylinder.

The studs are nominally 8 mm in diameter, and as a result of manufacturing considerations, the inside diameter of each stud-receiving hole of the head is approximately 1/16" larger than the outside diameter of the studs. The reason for the allowance of this spacing between the hole diameter and the stud diameter is to provide simplification of the manufacturing process. One engine manufacturer, the Yamaha Corporation of Japan, produces several combinations of heads and blocks which permit interchangeable use but necessitate this greater spacing. This spacing between stud and stud holes creates variability in engine performance depending upon accuracy of assembly. More specifically, maximum performance can only be obtained when the engine is assembled such that the head, and therefore the dome, is accurately positioned and centered over the piston and cylinder.

The procedure commonly used for centering the dome over the piston typically takes between 15 and 20 minutes to complete, and involves the repetition of a particular positioning procedure in order to ensure accurate assembly. This positioning procedure employs a length of soft solder, which is then bent and inserted through the spark plug hole in the top of the head and extended to the outer edge of the combustion chamber. The piston is then rolled through its top dead center position in order to create an impression upon the solder. The impression records the area of overlap between the face of the piston and the flat portion of the head surrounding the dome. This overlap area is commonly referred to as the "squish area" and the procedure as the "squish test". The solder is then removed and the squish area inspected to determine if the head is accurately and symmetrically positioned over the cylinder. If the position of the head is not satisfactory, i.e. the squish area is not uniformly distributed around the cylinder perimeter, the head is repositioned slightly and the squish test is repeated.

SUMMARY OF THE INVENTION

The present invention presents a locating implement for use in the assembly of mechanical components, such as engine parts. More particularly, the locating implement may be used in centering threaded mounting studs, extending from an engine block, within stud holes in an engine head. The locating implement is placed over the studs after the head has been installed, but before installation of the nuts used to secure the head. As the locating implement is slid down the stud to contact the head, the tolerances between the stud and the stud hole in the head are greatly reduced. Using the present invention, commonly occurring spacing of approximately 1/16" between the diameter of the stud and the inside wall of the stud hole can be reduced to about 0.002".

By centering the stud in the stud hole and greatly reducing the spacing therebetween, the locating implement permits more rapid and accurate engine assembly. The squish test may still be performed, but the present invention provides a much greater degree of initial positioning accuracy than was previous known and thereby greatly reduces the time required for engine assembly.

In a typical installation, three of the locating implements are used for six threaded studs. The locating implements are placed alternately in the six stud holes in the head. This installation provides three point positioning accuracy, and also serves to provide a visual indexing function for determining head orientation.

The advantages of the present invention are numerous and varied. The ease with which alignment and assembly are achieved is greatly increased, while the time required is greatly reduced. The visual indexing feature provided by the use of the locating implement provides a means by which the desired orientation of the head relative to the cylinder may be quickly determined and repeatedly achieved.

Structurally, the locating implement of the present invention provides a simple and inexpensive means for greatly increasing the speed and accuracy of aligning mechanical components such as the head and cylinder of an engine. In particular, the invention has a disk-shaped body with a central bore and a nipple of reduced outer diameter extending axially from one side of the body. About the periphery of the nipple, either a curved or an angled approach portion may transition to the adjacent face of the body.

The diameter of the central bore, extending through the body and nipple, is only slightly greater than the diameter of the threaded stud to be received therein. The outer diameter of the distal portion of the nipple is less than the diameter of the stud hole, formed in the head.

The nipple portion, extending axially from one side of the body of the invention, may include a lead portion to aid in initiating the concentrical alignment of the locating implement, and thereby the stud, within the corresponding stud hole of the head.

Installing and tightening nuts onto the studs causes the approach portion of the locating implement to deform the softer metal of the head, resulting in the locating implement becoming press-fit and thereby secured to the head in the properly aligned position. To facilitate the press-fit feature, the locating implement is fabricated of a material substantially harder than that used to form the head, which is frequently made from aluminum or pot metal.

BRIEF DESCRIPTION OF THE DRAWINGS

A better understanding of the present invention may be realized from a consideration of the following detailed description, taken in conjunction with the accompanying drawings, in which:

FIG. 4 is an enlarged side elevational view of the locating implement of FIG. 1, showing particular structural and dimensional details;

FIG. 5 is an enlarged side elevational view of the locating implement of FIG. 1, showing it installed for aligning a threaded stud within a stud hole; and FIG. 6 is an enlarged side elevational view of a locating implement of the invention having an alternative structure to that shown in FIG. 4.

DESCRIPTION OF THE PREFERRED EMBODIMENTS

Figure 1:
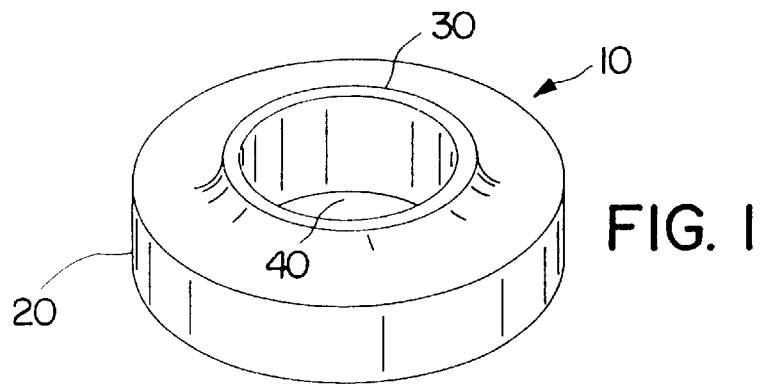
FIG. 1 is a perspective view of a locating implement in accordance with the present invention.

As shown in FIGS. 1, 4 and 5 a locating implement 10 in accordance with the present invention comprises a generally disk-shaped body 20 having a body diameter 22 and body thickness 24. Extending axially from one side of body 20 is a nipple 30 of reduced outer diameter 32 at its terminal end 34. Bore 40 with inner diameter 42 extends through body 20 and nipple 30.

Figure 2:
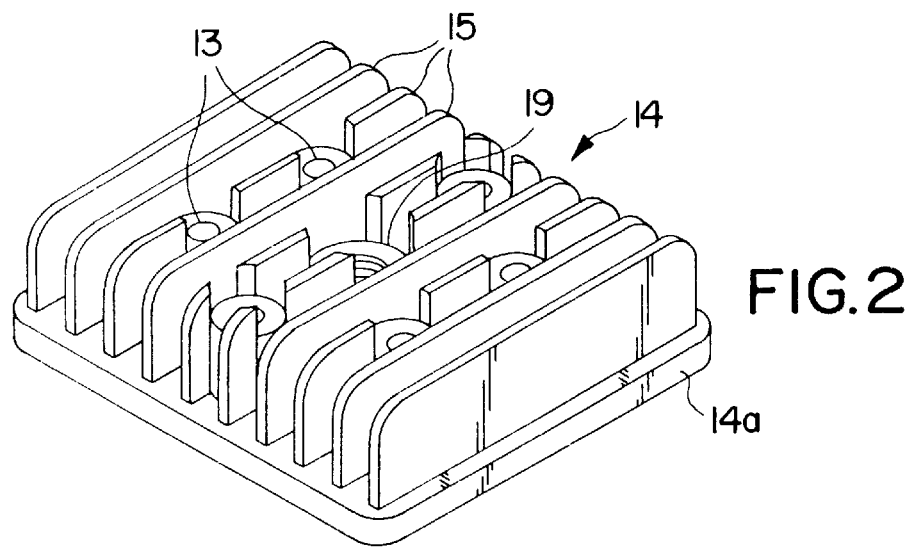
FIG. 2 is a perspective view of an engine head, showing cooling fins, a central spark plug receptacle, and symmetrically arranged stud holes.
Figure 3:
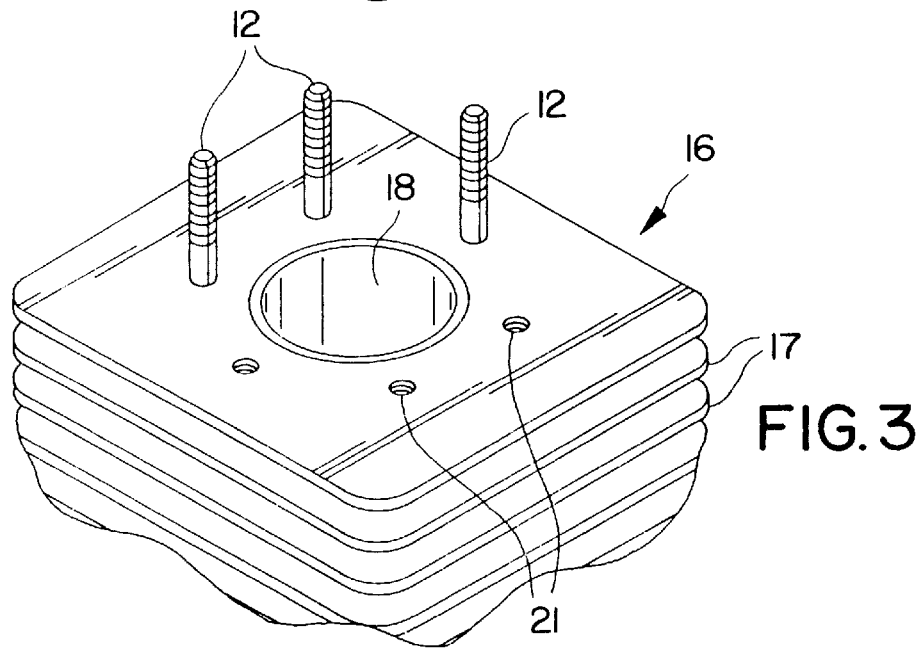
FIG. 3 is a perspective view of an engine cylinder, partially broken away, showing cooling fins, a cylinder and symmetrically arranged threaded studs extending from the block for securing the head thereto.

FIG. 2 shows an engine head 14 with cooling fins 15 extending upward from a base portion 14a. Stud holes 13 are symmetrically arranged to receive studs 12 extending from engine block 16 (FIG. 3). Mounting receptacle 19 for a spark plug (not shown) can be seen centrally disposed in head 14.

It should be understood that, while the material defining the stud holes 13 and the spark plug receptacle 19 is shown projecting above the base portion 14a, in many instances these elements are flush with the base portion 14a or even recessed slightly into the base portion.

FIG. 3 shows cylinder 16 with cooling fins 17, cylinder sleeve 18 and studs 12. Studs 12 are symmetrically arranged around cylinder sleeve 18 and extend from cylinder 16. Only three studs 12 are shown; holes 21 are depicted for three additional studs.

FIG. 4 shows lead portion 34 of diameter 32, about the periphery of nipple 30. Approach portion 36 extends between an adjacent face of body 20 and lead portion 34 of the nipple 30. Approach portion 36 may have the configuration of a radiused surface as shown. Alternatively, it may comprise a surface having a constant angle as shown in FIG. 6, preferably 45°. Implement length 26 is equal to the sum of body thickness 24 and nipple length 38.

As shown in FIG. 5, during assembly head 14 is installed over studs 12, then locating implement 10 is threaded onto a corresponding stud 12 with nipple 30 positioned on the side of body 20 facing head 14. As is apparent in FIG. 5, the stud holes in the head 14 are significantly larger than the outer diameter of the studs 12, thereby developing significant tolerance to facilitate the easy installation and removal of the head 14 on the block 16. However, while this makes for ease in installation and removal of the head in position on the block, it makes it more difficult to accurately position the head so that the location of the dome in the head relative to the cylinder in the block is properly set for peak engine performance, as described hereinabove. The installation of the implements 10 in the manner illustrated in FIG. 5 presents the desired solution to the problem of head location. This feature of the arrangement of locating implements of the present invention may be better appreciated from the following description.

In the preferred embodiment shown in FIG. 4, bore diameter 42 is approximately 0.3125". This is generally 0.002" greater than the outer thread diameter of stud 12, which is approximately 0.310", thereby permitting the disk 10 to slide onto stud 12. In a this embodiment, outer diameter 32 of the nipple at lead portion 34 is approximately 0.360". This diameter is at least 0.002" smaller than the diameter of the stud hole 13 of head 14, such that approach portion 36, and not lead portion 34, contacts head 14.

As a nut (not shown) is threaded onto stud 12 (see FIG. 5) to urge locating implement 10 axially along stud 12 in the direction of head 14, the action of the radiused approach portion 36 contacting the adjacent edges of the stud holes 13 in the head 14 forces the head to shift laterally as may be necessary to center the stud hole 13 on the stud 12, thereby ensuring accurate positioning. FIG. 5 shows lead portion 34 extending into a stud hole 13 in head 14, until approach portion 36 contacts head 14 and centers stud 12 to ensure accurate positioning.

As the driving force increases with the tightening of the nut on the stud 12, approach portion 36 tends to deform the portion of the head 14 surrounding the stud hole 13 to effect a secure press-fit of the locating implement 10 extending into the stud hole 13 of the head 14. To facilitate this press-fit, locating implement 10 is constructed of a material (such as stainless steel) which is substantially harder than that used for head 14 (generally aluminum). Thus, when the nuts are removed from the studs 12 so that the head 14 may be lifted away from the block, the locating implements 10 remain fixed in the stud holes 13 of the head 14. This makes it much easier to put the head 14 back in the position in which it was affixed previously. For example, if only three locating implements 10 are used on the six stud holes 13 and studs 12 in a pattern where two are on one side and one on another, the pattern serves as an indexing or referencing arrangement which enables the head to be put back in the same position as previously installed, thus facilitating the proper positioning of the head when it is reinstalled after removal.

Approach portion 36 may consist of either a curved surface (as shown in FIG. 4) or an angled surface (as shown in FIG. 6) extending from lead portion 34 of nipple 30 to the adjacent face of body 20. The alternative configuration for the locating implement 10 which is depicted in FIG. 6 performs in effectively the same way as the arrangement of FIG. 4. In FIG. 6, like elements are designated by the same reference numerals as in FIG. 4 with the addition of a prime designation to each numeral. Thus, FIG. 6 shows a locating implement 10' in the form of a round disk having a thickness 20', a nipple 30' and a bore 40' extending throughout the implement 10'. In place of the radiused portion 36, shown in FIG. 4, an approach portion 36' which extends between the lead portion 32' and the adjacent transverse face of the enlarged disk portion 20' extends at a constant angle, shown at 45° relative to the axis of the implement 10.

In the embodiment shown in FIG. 4, nipple length 38 is 0.050", lead portion 34 is 0.003" in length, and approach portion 36 is a curved surface having a radius of 0.047". In an alternative embodiment like that shown in FIG. 6, the approach portion 36 is an angled surface having an angle between 30° and 60°. An angled surface of 45° is shown in FIG. 6.

Although there have been described hereinabove various specific arrangements of a LOCATING IMPLEMENT FOR ENGINE HEAD in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. For use in an engine having a head aligned and secured on studs extending from the engine block and through stud holes in the head, a locating implement for use in aligning a stud concentrically with a corresponding stud hole comprising:

a generally disk-shaped body portion having a central bore extending therethrough from a first side to a second side; and a locating nipple portion of reduced diameter, integral with and extending axially from said first side of said body portion, at least part of said nipple portion having a smaller outer diameter than said stud holes.

2. The locating implement of claim 1 further comprising an approach portion extending between the end of said nipple portion remote from said body portion and said first side of said body portion.

3. The locating implement of claim 1 further comprising a generally cylindrical lead portion of constant diameter adjacent the end of said nipple portion remote from said body portion.

4. The locating implement of claim 2 wherein said approach portion comprises a curved surface of constant radius.

5. The locating implement of claim 2 wherein said approach portion comprises an angled surface at a predetermined fixed angle.

6. The locating implement of claim 2 wherein said approach portion is press-fit into secure engagement with said head.

7. For use in an engine having a head aligned and secured on studs extending from the engine block and through stud holes in the head, a locating implement for use in aligning a stud concentrically with a corresponding stud hole comprising:

a generally disk-shaped body portion having a central bore extending therethrough from a first side to a second side;

a nipple portion of reduced diameter, integral with and extending axially from said first side of said body portion, at least part of said nipple portion having a smaller outer diameter than said stud holes; and an approach portion extending between the end of said nipple portion remote from said body portion and said first side of said body portion.

8. The locating implement of claim 7 further comprising a generally cylindrical lead portion of constant diameter situated between the end of said nipple portion remote from said body portion and the termination of said approach portion.

9. The locating implement of claim 7 wherein said approach portion comprises a curved surface of constant radius.

10. The locating implement of claim 7 wherein said approach portion comprises an angled surface at a predetermined fixed angle.

11. The locating implement of claim 7 wherein said approach portion is press-fit into secure engagement with said head.

* * * * *